(12) United States Patent
Lee et al.

(10) Patent No.: US 12,155,811 B2
(45) Date of Patent: Nov. 26, 2024

(54) DUST MEASUREMENT DEVICE

(71) Applicant: LG ELECTRONICS INC., Seoul (KR)

(72) Inventors: Chaedeok Lee, Seoul (KR); Myungwon Kim, Seoul (KR); Jongmyoung Park, Seoul (KR); Sunghyun Yi, Seoul (KR); Hyunoh Kang, Seoul (KR); Woodeok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 448 days.

(21) Appl. No.: 17/601,491

(22) PCT Filed: Jun. 11, 2019

(86) PCT No.: PCT/KR2019/006993
§ 371 (c)(1),
(2) Date: Oct. 5, 2021

(87) PCT Pub. No.: WO2020/251069
PCT Pub. Date: Dec. 17, 2020

(65) Prior Publication Data
US 2022/0166964 A1    May 26, 2022

(51) Int. Cl.
*H04N 13/25* (2018.01)
*G06T 7/521* (2017.01)
(Continued)

(52) U.S. Cl.
CPC ............. *H04N 13/25* (2018.05); *G06T 7/521* (2017.01); *G06T 7/70* (2017.01); *G06T 11/00* (2013.01);
(Continued)

(58) Field of Classification Search
CPC .... H04N 13/25; H04N 13/254; H04N 13/257; H04N 23/11; H04N 2013/0081;
(Continued)

(56) References Cited

U.S. PATENT DOCUMENTS

2017/0064278 A1* 3/2017 Posselius .................. G06T 5/50
2017/0330053 A1* 11/2017 Park ........................ G06T 11/60
(Continued)

FOREIGN PATENT DOCUMENTS

JP        10-221237 A    8/1998
JP        2021-67682 A   4/2021
(Continued)

*Primary Examiner* — Girumsew Wendmagegn
(74) *Attorney, Agent, or Firm* — Birch, Stewart, Kolasch & Birch, LLP

(57) ABSTRACT

The present invention relates to a dust measurement device for implementing a dust distribution image through a non-coplanar stereo vision camera, and provides a dust measurement device comprising: a stereo vision camera which includes a first camera for obtaining a true color image and a second camera for obtaining an infrared image; a control unit for generating a fine dust distribution image by using a light amount ratio of the amount of light obtained from a first pixel array of the first camera to the amount of light obtained from a second pixel array of the second camera; and a display device for outputting the fine dust distribution image.

14 Claims, 15 Drawing Sheets

(51) Int. Cl.
*G06T 7/70* (2017.01)
*G06T 11/00* (2006.01)
*H04N 13/254* (2018.01)
*H04N 13/257* (2018.01)
*H04N 23/11* (2023.01)
*G01N 15/00* (2006.01)
*G01N 15/075* (2024.01)

(52) U.S. Cl.
CPC ......... *H04N 13/254* (2018.05); *H04N 13/257* (2018.05); *H04N 23/11* (2023.01); *G01N 2015/0046* (2013.01); *G01N 15/075* (2024.01); *G06T 2207/10012* (2013.01); *G06T 2207/10024* (2013.01); *G06T 2207/10048* (2013.01)

(58) Field of Classification Search
CPC .... H04N 13/239; H04N 13/271; G06T 7/521; G06T 7/70; G06T 11/00; G06T 2207/10012; G06T 2207/10024; G06T 2207/10048; G06T 7/0004; G06T 11/001; G06T 7/0002; G01N 2015/0046; G01N 2015/0693; G01N 15/06; G01N 21/94; G01N 15/0227; G01N 2223/509
See application file for complete search history.

(56) References Cited

U.S. PATENT DOCUMENTS

2020/0045247 A1* 2/2020 Okamoto ............... H04N 5/265
2021/0142496 A1* 5/2021 Sato .......................... G06T 7/55

FOREIGN PATENT DOCUMENTS

| | | |
|---|---|---|
| JP | 2021-156824 A | 10/2021 |
| KR | 10-2012-0068747 A | 6/2012 |
| KR | 10-2015-0080101 A | 7/2015 |
| KR | 10-2015-0115926 A | 10/2015 |
| KR | 10-1558419 B1 | 10/2015 |
| KR | 10-2017-0140786 A | 12/2017 |

\* cited by examiner (a) (b)

(a)

(b)

(a)  (b)

(a)

(b)

(a)

(b)

DUST MEASUREMENT DEVICE

CROSS REFERENCE TO RELATED APPLICATIONS

This application is the National Phase of PCT International Application No. PCT/KR2019/006993, filed on Jun. 11, 2019, which is hereby expressly incorporated by reference into the present application.

TECHNICAL FIELD

The present disclosure relates to a dust measuring device, and more particularly, is applicable to a technical field of implementing dust distribution image information using a non-coplanar stereo vision camera.

BACKGROUND ART

In modern society, continuous industrialization deteriorates air quality, including fine dust, and interest and concern about air pollution in cities are increasing worldwide. In particular, fine dust, which is Particulate Matter (PM), accounts for most of the particles generated by artificial industrial activities, and materials of 10 um or less are defined as PM 10 depending on the size of the particles, and materials of 2.5 um or less are marked as PM2.5.

Methods of measuring fine dust include automatic measurement methods and manual measurement methods. The automatic measurement methods that can automatically record measurement results include a beta gauge method and a light scattering method. The manual measurement methods that require manual confirmation of measurement results include a gravimetric method and the like.

The beta gauge method is also called beta attention monitor, and is a method of measuring density before and after collection by splitting beta-rays into a collection tape wound over time like tape. Specifically, it is a method of checking the dust density by measuring the light attenuation ratio of light intensity by applying beta rays to the collection tape. The beta gauge method has the advantage of being easy and convenient owing to automatic measurement availability, but it takes about an hour to obtain a measurement result, making it difficult to perform real-time measurement.

The light scattering method is a method of irradiating light onto particulate matter floating in the atmosphere and measuring the amount of scattered light. Specifically, when light is irradiated to particulate materials having the same physical properties, the amount of scattered light is proportional to the mass density, and the amount of scattered light is measured using this principle and the density of particulate matter is obtained from the value. According to the light scattering method, real-time measurement is possible, a corresponding device is easy to carry, and a single device enables per-particle size measurements at the same time. On the other hand, it is disadvantageous in that an error may occur in the process of measuring a number density of particles and converting it into a mass density.

The gravimetric method is a method of measuring the density of dust by measuring the weight of a filter paper before and after collection. The gravimetric method is advantageous in that it costs relatively low, but it is difficult to measure in real time, and an error occurs due to the influence of an experimental environment such as humidity, temperature, static electricity, and the like during a process of measuring the weight of a filter paper before and after collection.

The common point of the conventional dust measuring device is to measure dust at a specific point. That is, the conventional dust measuring device has a disadvantage in that it is difficult to confirm the total dust density distribution. In addition, the beta gauge method and the gravimetric method, excluding the light scattering method, have disadvantages in that it is difficult to measure dust in real time. Accordingly, there is a disadvantage in that it is difficult to provide a dust distribution image to a user in real time using the conventional dust measuring device.

DISCLOSURE OF THE INVENTION

Technical Task

One technical task of the present disclosure is to obtain a dust distribution image using a non-coplanar stereo vision camera that obtains a true color image and an infrared image.

Technical Solutions

In one technical aspect of the present disclosure, provided is an apparatus for measuring dust, including a stereo vision camera including a first camera obtaining a true color image and a second camera obtaining an infrared image, a controller creating a fine dust distribution image based on a light amount ratio of a light amount obtained from a first pixel array of the first camera to a light amount obtained from a second pixel array of the second camera, and a display device outputting the fine dust distribution image.

The controller may create the fine dust distribution image to differentiate at least one of a brightness or a chroma in response to the light amount ratio.

The controller may obtain a distance information of a subject via a stereo vision operation between the true color image and the infrared image and create the fine dust distribution image to differentiate at least one of a brightness or a chroma in response to the distance information.

The second camera may obtain the infrared image by detecting at least one of reflective infrared or thermal infrared.

The reflective infrared may include at least one of Near Infrared (NIR) or Short-Wave Infrared (SWIR) applied from a light source.

The thermal infrared may include at least one of Medium Wave Infrared (MWIR) or Far Infrared (FIR) as infrared irradiated from a subject.

The apparatus may further include a memory storing the light amount ratio related to fine dust density.

The display device may output the fine dust distribution to overlap at least one of the true color image or the infrared image.

The controller may control the display device to output the fine dust distribution image to overlap the true color image. If the light amount ratio belongs to a preset range, the controller may control the display device to output the fine dust distribution image to overlap the infrared image.

The controller may control the display device to output the fine dust distribution image to overlap the true color image. If the light amount ratio belongs to a preset range, the controller may extract subject information at a corresponding position from the infrared image and control the display device to output the subject information to overlap the true color image.

The subject information may include at least one of an outline information configuring the subject, a determination information of the subject, or a position information of the subject.

The first camera may have a same resolution of the second camera and obtain the light amount ratio between counter-pixels of the first and second pixel arrays.

The first camera may have a resolution different from that of the second camera and the controller may obtain the light amount ratio by dividing an amount of light incident on at least one of one pixel of the first pixel array or one pixel of the second pixel array based on a difference in the resolution.

Advantageous Effects

Effects of a dust measuring device according to the present disclosure are described as follows.

The present disclosure may measure dust distribution and density of a wide area in real time.

The present disclosure may implement an image of dust distribution and density of a wide area and provide it to a user.

The present disclosure may supplement visibility via an infrared image if failing in securing visibility in a true color image due to dust.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

The following embodiments of the present disclosure are intended only to embody the present disclosure and of course not to restrict or limit the scope of the present disclosure. The matter easily inferable by those skilled in the art, to which the present disclosure pertains, is construed as belonging to the right scope of the present disclosure.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

Figure 1:
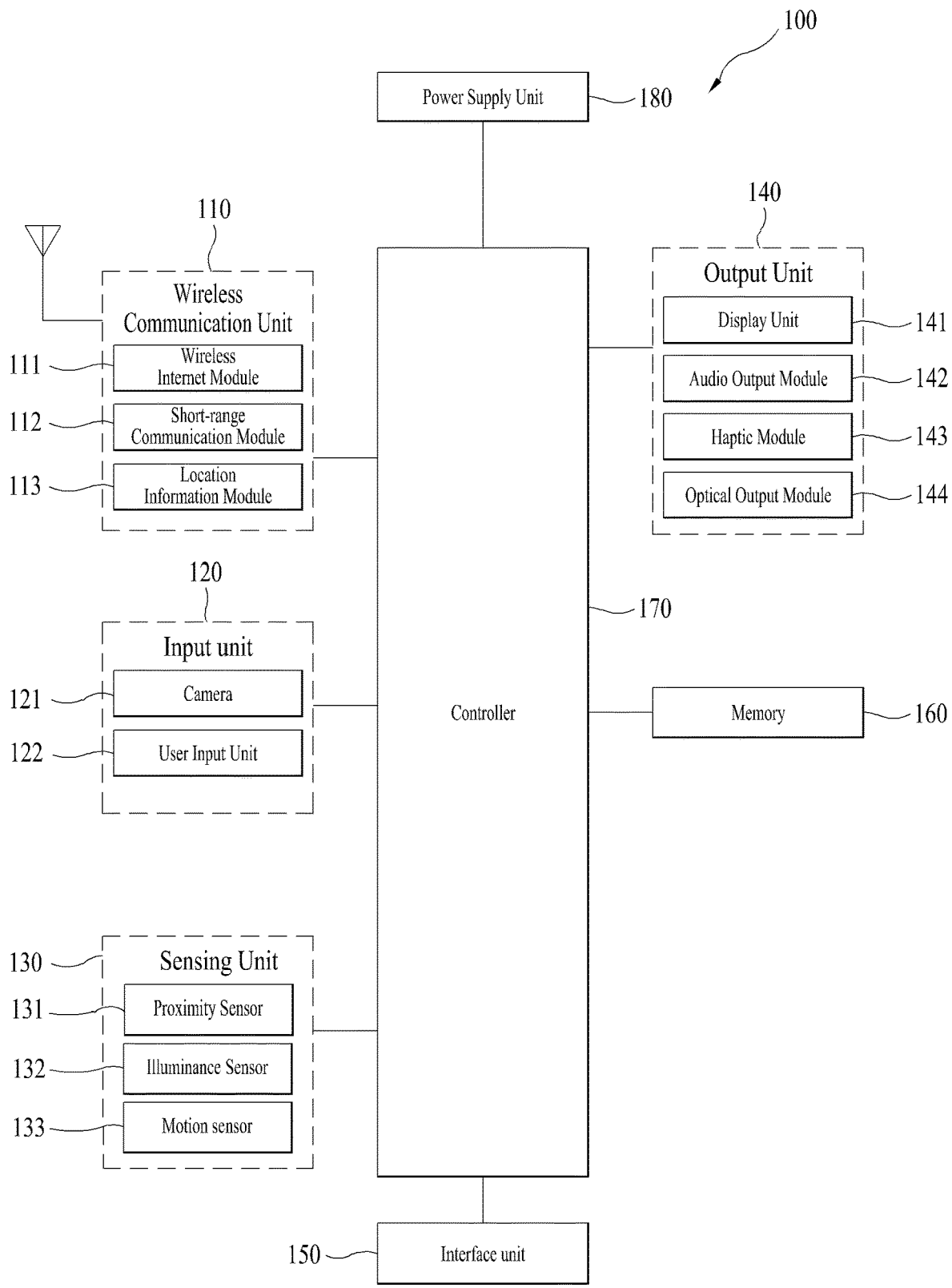
FIG. 1 is a block diagram to describe a dust measuring device related to the present disclosure.

FIG. 1 is a block diagram to describe a dust measuring device related to the present invention.

The dust measuring device 100 is shown having components such as a wireless communication unit 110, an input unit 120, a sensing unit 130, an output unit 140, an interface unit 150, a memory 160, a controller 170, and a power supply unit 180. It is understood that implementing all of the illustrated components is not a requirement, and that greater or fewer components may alternatively be implemented.

Since the components shown in FIG. 1 are not essential to implement the dust measuring device 100, the dust measuring device 100 described in the present specification may have more or less components than those listed above.

For instance, the wireless communication unit 110 typically includes one or more components which permit wireless communication between the dust measuring device 100 and a wireless communication system or network within which the dust measuring device is located.

The wireless communication unit 110 includes one or more of a wireless Internet module 111, a short-range communication module 112, and a location information module 113.

The short-range communication module 112 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi) and Wi-Fi Direct, and the like. The short-range communication module 112 in general supports wireless communications between the dust measuring device 100 and a wireless communication system, communications between the dust measuring device 100 and another dust measuring device 100, or communications between the dust measuring device and a network where another dust measuring device 100 (or an external server) is located, via wireless area networks. One example of the wireless area networks is a wireless personal area networks.

In some embodiments, another dust measuring device (which may be configured similarly to dust measuring device 100) may be a wearable device, for example, a smart watch, a smart glass or a head mounted display (HMD), which is able to exchange data with the dust measuring device 100 (or otherwise cooperate with the dust measuring device 100). The short-range communication module 112 may sense or recognize the wearable device, and permit communication between the wearable device and the dust measuring device 100. In addition, when the sensed wearable device is a device which is authenticated to communicate with the dust measuring device 100, the controller 170, for example, may cause transmission of data processed in the dust measuring device 100 to the wearable device via the short-range communication module 112. Hence, a user of the wearable device may use the data processed in the dust measuring device 100 on the wearable device. For example, when a call is received in the dust measuring device 100, the user may answer the call using the wearable device. Also, when a message is received in the dust measuring device 100, the user can check the received message using the wearable device.

For example, data about skin condition measured by the dust measuring device 100 is transmitted to a mobile terminal or a wearable device, the data is converted into a database to obtain the tendency in a skin condition change, and the driving of the dust measuring device can be controlled by feedback based on the obtained tendency.

Particularly, the dust measuring device 100 according to the present disclosure may employ short-range communication technologies such as Bluetooth™, Radio Frequency Identification (RFID), Infrared Data Association (IrDA), Ultra Wideband (UWB), ZigBee, Near Field Communication (NFC), Wireless Universal Serial Bus (Wireless USB), etc.

An NFC module provided to the dust measuring device 100 among them supports terminal-to-terminal non-contact type short-range wireless communication in a distance ranging around 10 cm. The NFC module may operate in one of a card mode, a reader mode, and a P2P mode. In order for the NFC module to operate in card mode, the dust measuring device 100 may further include a security module configured to store card information. Here, the security module may include a physical medium such as Universal Integrated Circuit Card (UICC) (e.g., Subscriber Identification Module (SIM) or Universal SIM (USIM)), Secure micro SD and sticker, etc., or a logical medium (e.g., embedded Secure Element (SE)) embedded in the dust measuring device 100. Data exchange may be performed between the NFC module and the security module based on Single Wire Protocol (SWP).

In case that the NFC module operates in card mode, the dust measuring device 100 may forward the card information stored therein to an outside like the traditional IC card.

In case that the NFC module operates in reader mode, the dust measuring device may read data from an external tag. In doing so, data received by the dust measuring device from the tag may be coded in NFC Data Exchange Format determined by NFC Forum. Besides, NFC Forum provides four record types. Specifically, NFC Forum provides four Record Type Definitions (RTDs) such as Smart Poster, Text, Uniform Resource Identifier (URI) and General Control.

In case that the NFC module operates in Peer-To-Peer (P2P) mode, the dust measuring device 100 may perform P2P communication with another device. In doing so, Logical Link Control Protocol (LLCP) may apply to the P2P communication. For the P2P communication, a connection may be created between the dust measuring device 100 and another external terminal. In doing so, the created connection may be classified into a connection less mode of exchanging one packet and ending and a connection-oriented mode of continuously exchanging packets. Data, setup parameters for Bluetooth and Wi-Fi connections and the like may be exchanged via the P2P communication. Yet, as an available distance of the NFC communication is short, the P2P mode may be effectively utilized in exchanging data in small size.

The location information module 113 is generally configured to detect, calculate, derive or otherwise identify a position of the dust measuring device. As an example, the location information module 113 includes a Global Position System (GPS) module, a Wi-Fi module, or both. As one example, when the dust measuring device uses a GPS module, a position of the dust measuring device may be acquired using a signal sent from a GPS satellite. As another example, when the dust measuring device uses the Wi-Fi module, a position of the dust measuring device can be acquired based on information related to a wireless access point (AP) which transmits or receives a wireless signal to or from the Wi-Fi module.

The input unit 120 includes a camera 121 for obtaining images or video, and a user input unit 122 (for example, a touch key, a push key, a mechanical key, and the like) for allowing a user to input information. Data (for example, audio, image, and the like) is obtained by the input unit 120 and may be analyzed and processed by controller 170 according to user commands thereof.

The camera 121 processes image frames of a still image, moving images and the like obtained by the image sensor in video call mode or shot mode. The processed image fames may be displayed on the display unit 141 or stored in the memory 160.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 121 provided to the dust measuring device 100 may perform a function of photographing an attached skin surface condition. If the display unit 141 is included, the photographed skin surface condition is outputted to enable a user to check the output.

The user input unit 122 is a component that permits input by a user. Such user input may enable the controller 170 to control operation of the dust measuring device 100. The user input unit 122 may include one or more of a mechanical input element (for example, a key, a button located on a front and/or rear surface or a side surface of the dust measuring device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the dust measuring device at a location that is other than the touch screen. On the other hand, the virtual key or the visual key may be displayed on the touch screen in various shapes, for example, graphic, text, icon, video, or a combination thereof.

The sensing unit 130 is typically implemented using one or more sensors configured to sense internal information of the dust measuring device, the surrounding environment of the dust measuring device, user information, and the like. For example, in FIG. 1, the sensing unit 130 may include at least one of a proximity sensor 131, an illumination sensor 132, a touch sensor, an acceleration sensor, a magnetic sensor, a G-sensor, a gyroscope sensor, a motion sensor 133, an RGB sensor, an infrared (IR) sensor, a finger scan sensor, a ultrasonic sensor, an optical sensor (for example, camera 121), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The dust measuring device 100 may be configured to utilize information obtained from sensing unit 130, and in particular, information obtained from one or more sensors of the sensing unit 130, and combinations thereof.

The sensing unit 130 is generally configured to sense one or more of internal information of the dust measuring device, surrounding environment information of the dust measuring device, user information, or the like. The controller 170 generally cooperates with the sending unit 130 to control operation of the dust measuring device 100 or execute data processing, a function or an operation associated with an application program installed in the dust measuring device based on the sensing provided by the sensing unit 130. The sensing unit 130 may be implemented using any of a variety of sensors, some of which will now be described in more detail.

The proximity sensor 131 may include a sensor to sense presence or absence of an object approaching a surface, or an object located near a surface, by using an electromagnetic field, infrared rays, or the like without a mechanical contact. The proximity sensor 131 may be arranged at an inner region of the dust measuring device covered by the touch screen, or near the touch screen.

The proximity sensor 131, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 131 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 131 may sense proximity touch, and proximity touch patterns (for example, distance, direction, speed, time, position, moving status, and the like). In general, controller 170 processes data corresponding to proximity touches and proximity touch patterns sensed by the proximity sensor 131, and cause output of visual information on the touch screen. In addition, the controller 170 can control the dust measuring device 100 to execute different operations or process different data according to whether a touch with respect to a point on the touch screen is either a proximity touch or a contact touch.

A touch sensor can sense a touch applied to the touch screen, such as display unit 141, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 141, or convert capacitance occurring at a specific part of the display unit 141, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

In some embodiments, the controller 170 may execute the same or different controls according to a type of touch object that touches the touch screen or a touch key provided in addition to the touch screen. Whether to execute the same or different control according to the object which provides a touch input may be decided based on a current operating state of the dust measuring device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 170, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

When a touch input is sensed by a touch sensor, corresponding signals may be transmitted to a touch controller. The touch controller may process the received signals, and then transmit corresponding data to the controller 170. Accordingly, the controller 170 may sense which region of the display unit 141 has been touched. Here, the touch controller may be a component separate from the controller 170, the controller 170, and combinations thereof.

The output unit 140 is typically configured to output various types of information, such as audio, video, tactile output, and the like. The output unit 140 is shown having a display unit 141, an audio output module 142, a haptic module 143, and an optical output module 144. The display unit 141 may have an inter-layered structure or an integrated structure with a touch sensor in order to facilitate a touch screen. The touch screen may provide an output interface between the dust measuring device 100 and a user, as well as function as the user input unit 122 which provides an input interface between the dust measuring device 100 and the user.

The display unit 141 is generally configured to output information processed in the dust measuring device 100. For example, the display unit 141 may display execution screen information of an application program executing at the dust measuring device 100 or user interface (UI) and graphic user interface (GUI) information in response to the execution screen information.

The interface unit 150 serves as an interface with various types of external devices that can be coupled to the dust measuring device 100. The interface unit 150, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the dust measuring device 100 may perform assorted control functions associated with a connected external device, in response to the external device being connected to the interface unit 150.

The memory 160 is typically implemented to store data to support various functions or features of the dust measuring device 100. For instance, the memory 160 may be configured to store application programs executed in the dust measuring device 100, data or instructions for operations of the dust measuring device 100, and the like. Some of these application programs may be downloaded from an external server via wireless communication. Other application programs may be installed within the dust measuring device 100 at time of manufacturing or shipping, which is typically the case for basic functions of the dust measuring device 100 (for example, receiving a call, placing a call, receiving a message, sending a message, and the like). It is common for application programs to be stored in the memory 160, installed in the dust measuring device 100, and executed by the controller 170 to perform an operation (or function) for the dust measuring device 100.

The controller 170 typically functions to control overall operation of the dust measuring device 100, in addition to the operations associated with the application programs. The controller 170 may provide or process information or functions appropriate for a user by processing signals, data, information and the like, which are input or output by the various components depicted in FIG. 1, or activating application programs stored in the memory 160.

Figure 2:
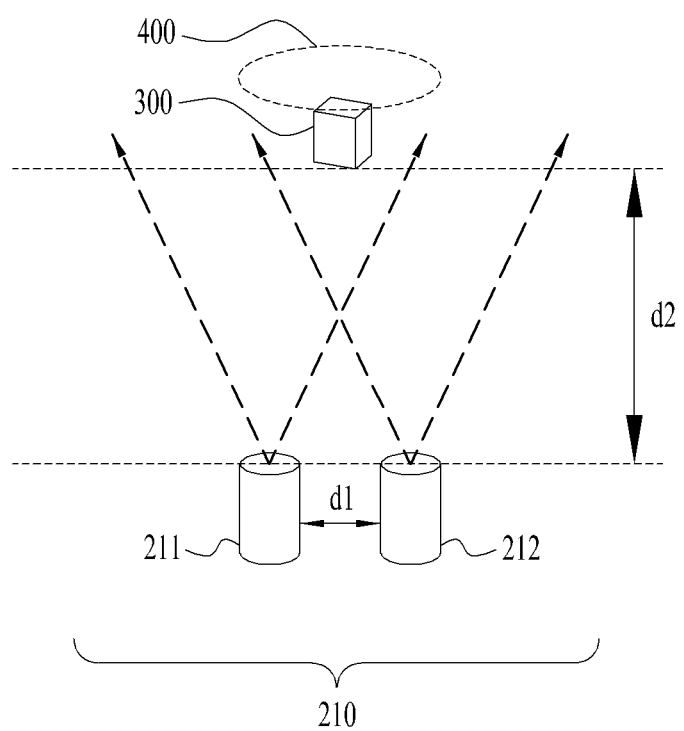
FIG. 2 is a diagram to describe a non-coplanar stereo vision camera included in a dust measuring device related to the present disclosure.

Moreover, the controller 170 controls some or all of the components illustrated in FIG. 2 according to the execution of an application program that have been stored in the memory 160.

The power supply unit 180 can be configured to receive external power or provide internal power in order to supply appropriate power required for operating elements and components included in the dust measuring device 100. The power supply unit 180 may include a battery, and the battery may be configured to be embedded in the terminal body, or configured to be detachable from the terminal body.

At least some of the above components can cooperatively operate to implement operations, controls and controlling methods of the dust measuring device according to various embodiments described in the following. The operations, controls or controlling methods of the dust measuring device can be implemented on the dust measuring device by running at least one application program saved to the memory 160.

FIG. 2 is a diagram to describe a non-coplanar stereo vision camera included in a dust measuring device related to the present disclosure.

The stereo vision camera 210 may obtain a distance information d2 of a subject 300 using binocular disparity via two cameras 211 and 212 included in a manner of being spaced apart from each other. Specifically, if the subject 300 is located in a view angle overlapping area 400 between the two cameras 211 and 212, the distance information d2 from the subject 300 may be obtained. To this end, the stereo vision camera 210 of the present disclosure may include the two cameras 211 and 212 spaced apart from each other in a prescribed distance d1.

The two cameras included in the stereo vision camera 210 of the present disclosure may not be identical to each other. Specifically, the stereo vision camera 210 of the present disclosure may include a first camera 211 obtaining a true color image and a second camera 212 obtaining an infrared image.

The first camera 211 obtaining a true color image of the present disclosure may obtain a true color image by receiving visible rays reflecting from a subject.

The second camera 212 obtaining an infrared image of the present disclosure may obtain an infrared image by receiving infrared rays. The second camera 212 of the present disclosure may include an infrared camera obtaining an infrared image by sensing at least one of reflective infrared rays and thermal infrared rays. The reflective infrared rays may include at least one of Near Infrared (NIR) and Short-Wave Infrared (SWIR), applied from a light source. The light source may be included in the second camera 212. The thermal infrared rays may include at least one of Medium Wave Infrared (MWIR) and Far Infrared (FIR). Yet, as the present disclosure measures dust distribution and density via a difference between visible rays and infrared rays in being scattered due to dust in the air, it may be preferable to use thermal infrared rays of which wavelength difference from visible rays is greater than that from reflective infrared rays.

According to a method of obtaining the distance d2 to the subject 300 via stereo operation, counter-pixels of the subject 300 are extracted from the true color image obtained by the first camera 211 and the infrared image obtained by the second camera 212 and the distance (d2) information may be obtained via disparity between the counter pixels. Here, the counter pixel may include at least one of pixels configuring an outline of the subject 300 or a center pixel of the subject 300.

According to the present disclosure, as the two cameras including the first camera 211 and the second camera 212 are spaced apart from each other, the distance information of the subject 300 may be obtained and dust distribution and density may be measured using a fact that the first and second cameras 211 and 212 are non-coplanar cameras differing from each other in received wavelength. A method of measuring dust distributed between the subject 300 and the stereo vision camera 210 via the first and second cameras 211 and 212 is described as follows.

Figure 3:
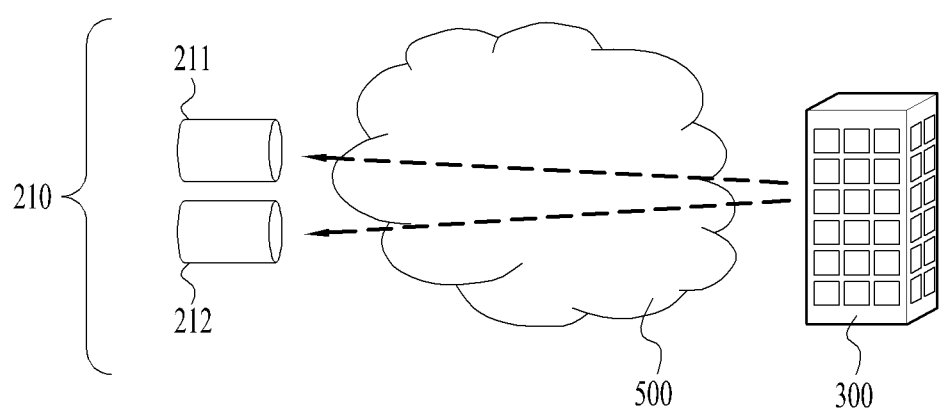
FIGS. 3 to 5 are diagrams to describe a method of obtaining a dust distribution image using a non-coplanar stereo vision camera of the present disclosure.
Figure 4:
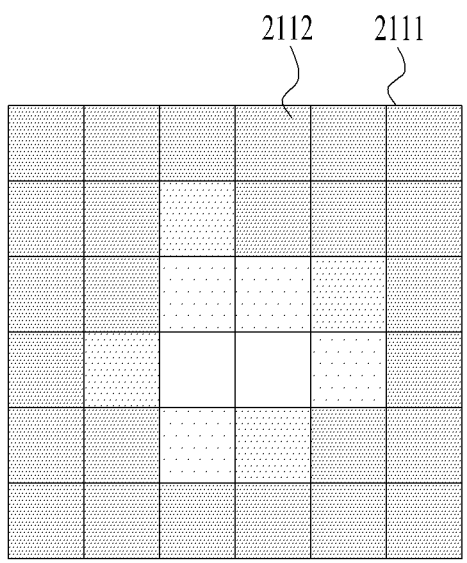
Figure 4:
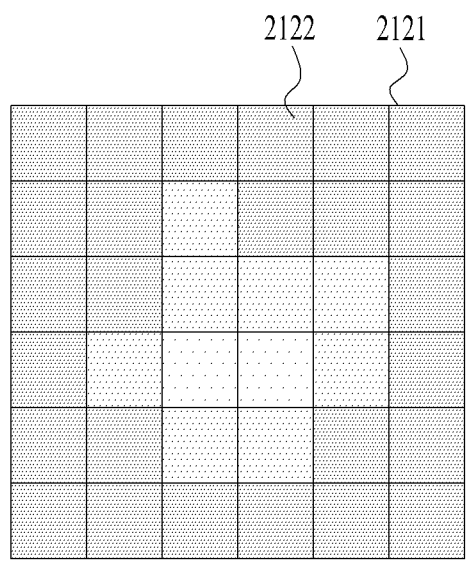
Figure 5:
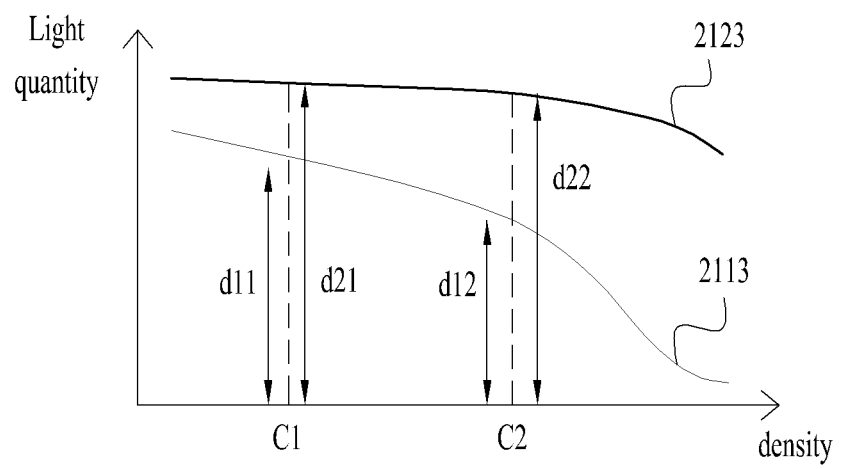

FIGS. 3 to 5 are diagrams to describe a method of obtaining a dust distribution image using a non-coplanar stereo vision camera of the present disclosure.

The existing dust measuring device can measure only the dust density at a specific point, and a multitude of dust measuring devices were required to measure the dust distribution. In addition, the existing dust measuring device has limitations in obtaining continuous dust distribution.

As shown in FIG. 3, the present disclosure intends to provide a dust measuring device that implements dust 500 distributed in a wide area positioned between a stereo vision camera 210 and a subject 300 as a continuous image.

The present disclosure intends to obtain a dust distribution image using a light amount ratio of an amount of light obtained by a first pixel array 4111 of a first camera 211 to an amount of light obtained by a second pixel array 4121 of a second camera 212.

FIG. 4 shows the amount of light incident on each pixel in the pixel arrays 2111 and 2121, with different brightness. Specifically, FIG. 4 (a) illustrates the first pixel array 2111 included in an image sensor included in the first camera 211. FIG. 4 (b) illustrates the second pixel array 2121 included in an image sensor included in the second camera 212. Specifically, FIG. 4(a) shows the amount of light incident on each pixel 2112 configuring the first pixel array 2111 with different brightness. For example, in FIG. 4 (a), when the pixel 2112 is displayed darkly, it means that the amount of light incident on the corresponding pixel is large, and when the pixel is displayed softly, it means that the amount of light incident on the corresponding pixel is small. Likewise, when the pixel 2122 is displayed darkly in FIG. 4(b), it means that the amount of light incident on the corresponding pixel is large, and when it is displayed lightly, the amount of light incident on the corresponding pixel is small.

The reason why the amounts of light incident on each pixel in each of the pixel arrays 2111 and 2121 are different is that the amount of light incident is scattered by dust in the atmosphere. In this case, the difference in the amount of light between pixels in the first pixel array 2111 may be different from the difference in the amount of light between pixels in the second pixel array 2121. This is because the wavelengths received by the first pixel array 2111 and the second pixel array 2121 are scattered to the different extents by dust in the atmosphere, respectively. Specifically, the first pixel array 2111 receives the wavelength of the visible light region, and the wavelength of the visible light region has the extent of being scattered by dust in the atmosphere, which is greater than that of the wavelength of the ultraviolet light region received by the second pixel array 2121.

FIG. 5 shows a rate at which each of visible light and ultraviolet rays is scattered according to the density of dust. Specifically, FIG. 5 illustrates changes in the amounts 2113 and 2123 of lights, which are incident on pixels 2112 and 2122 of the pixel array 2111 and 2121, respectively, in response to dust density. Visible light and ultraviolet light are scattered differently by dust in the atmosphere. Accordingly, the ratio of the amounts of light between the corresponding pixels 2112 and 2122 of the first pixel array 2111 and the second pixel array 2121 may be different depending on the density of dust in the atmosphere. For example, when the dust density in the atmosphere is C1, the ratio of the amounts of light between the corresponding pixels 2112 and 2122 of the first pixel array 2111 and the second pixel array 2121 may be d11:d21. On the other hand, when the dust density in the atmosphere is C2, the ratio of the amounts of light between the corresponding pixels 2112 and 2122 of the first pixel array 2111 and the second pixel array 2121 may be d12:d22, which is different from the case where the density of dust in the air is C1.

The present disclosure may measure a dust density at a position corresponding to a corresponding pixel through a light amount ratio between the corresponding pixels 2112 and 2122 of the first pixel array 2111 and the second pixel array 2121. To this end, the present disclosure may include a memory for storing dust density in response to the light amount ratio. That is, the present disclosure may measure a light amount ratio and detect dust density at a position corresponding to a specific pixel through dust density stored in the memory.

The present disclosure measures dust density through a light amount ratio, and the first camera 211 and the second camera 212 need to have the same resolution. That is, according to the present disclosure, the first pixel array 2111 and the second pixel array 2121 have the pixels 2112 and 2122 in one-to-one correspondence, and a light amount ratio may be obtained through the amounts of light incident on the corresponding pixels 2112 and 2122, respectively.

However, the present disclosure measures dust density using the non-coplanar stereo camera 210, and the first camera 211 and the second camera 212 may differ from each other in resolution. Hereinafter, in case that the first camera 211 and the second camera 212 may differ from each other in resolution, a method of obtaining the light amount ratio will be described.

Figure 6:
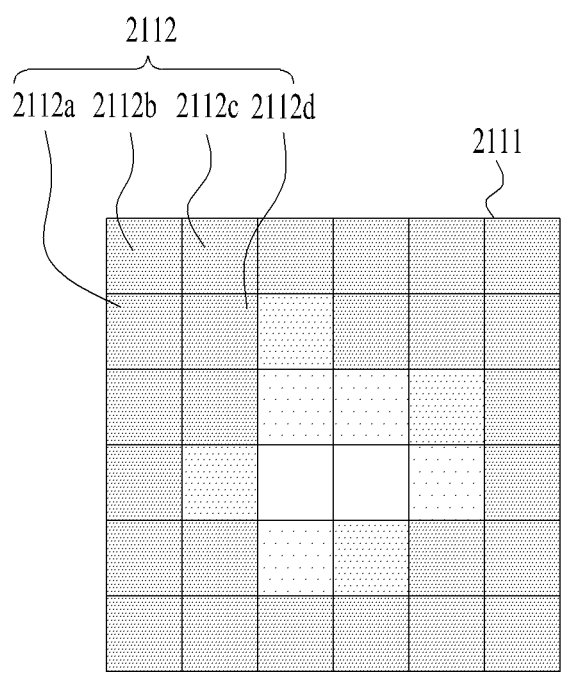
FIG. 6 is a diagram to describe a method of obtaining a dust distribution image if both cameras of a non-coplanar stereo vision camera differ from each other in resolution.
Figure 6:
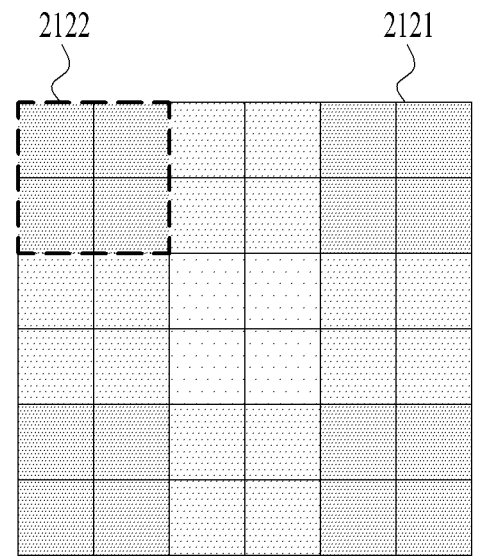

FIG. 6 is a diagram to describe a method of obtaining a dust distribution image if both cameras of a non-coplanar stereo vision camera differ from each other in resolution.

The present disclosure obtains a dust distribution image using the non-coplanar stereo vision camera 210, and the cameras 211 and 212 on both sides may differ from each other in resolution. In this case, since each pixel 2112 of the first pixel array 2111 and each pixel 2122 of the second pixel array 2121 fail in being put in one-to-one correspondence, it may be difficult to obtain the light amount ratio. If so, the present disclosure may obtain a light amount ratio in a manner of dividing a light amount incident on at least one of one pixel 2112 of the first pixel array 2111 and one pixel 2122 of the second pixel array 2121 based on the resolution difference.

For example, as resolution of the first pixel array 2111 is higher than that of the second pixel array 2121, a plurality of the pixels 2112 of the first pixel array 2111 may correspond to one pixel 2122 of the second pixel array 2121. Alternatively, as resolution of the second pixel array 2121 is higher than that of the first pixel array 2111, a plurality of the pixels 2122 of the second pixel array 2121 may correspond to one pixel 2112 of the first pixel array 2111. In some cases, a plurality of the pixels 2112 of the first pixel array 2111 correspond to a plurality of the pixels 2122 of the second pixel array 2121 but differ from each other in the number of corresponding pixels. Specifically, FIG. 6 shows an embodiments that resolution of the first pixel array 2111 is higher than that of the second pixel array 2121 and that four pixels 2112a to 2112d of the first pixel array 2111 correspond to one pixel 2122 of the second pixel array 2121. In this case, an amount of light incident on the one pixel 2122 of the second pixel array 2121 is divided into four equal parts, and the divided light amount is compared with an amount of light incident on one of the pixels 2112a to 2112d of the first pixel array 2111, whereby the light amount ratio can be calculated.

As described above, the present disclosure may compute the distribution of dust by calculating a light amount ratio of each pixel of the first pixel array 2111 or the second pixel array 2121. Namely, if the light amount ratio calculated per pixel belongs to a preset range, it may be measured that dust exists at a portion corresponding to the corresponding pixel. Through the light amount ratio calculated per pixel, the present disclosure may create a dust distribution image and output the created dust distribution image via the display device. The present disclosure may obtain a true color image via the first camera 211, obtains an infrared image via the second camera 212, output one of the obtained true color image and the obtained infrared image through the display device, and output a created dust distribution image in a manner of overlapping.

The dust distribution image may be created in a manner of differentiating a dust distributed area in color sense. Alternatively, the dust distribution image may be created in a manner of indicating a boundary enclosing a dust distributed area. In case of creating the dust distribution image in a manner of differentiating a color sense of a dust distributed area, at least one of a brightness and a chroma may be differentiated depending on a light amount ratio. For example, if a light amount ratio corresponds to a case of high dust density, a brightness or chroma of a position matching a corresponding pixel may be raised. On the contrary, if a light amount ratio corresponds to a case of low dust density, a brightness or chroma of a position matching a corresponding pixel may be lowered. A user may visually check dust density of a dust distributed area as well as the dust distributed area via a dust distribution image displayed on a display.

An amount of light incident on each pixel of the first pixel array 2111 and the second pixel array 2121 may vary depending on a distance from a subject. This is because if a distance between the subject and the each pixel is long, a scattered light amount is considerable despite low dust density in the atmosphere. Specifically, an extent that light is scattered depending on a distance may be represented as a following equation. First of all, μs is a scattering coefficient depending on a medium and a dust size, d is a distance between a sensor and a measurement target, A is a constant, and I(d)/I0 indicates a light amount attenuation rate. Namely, the light amount attenuation rate I(d)/I0 increases in proportion to a distance d between the sensor and the measurement target.

$$\frac{I(d)}{I_0} = A \times \exp(-\mu_0 \times d)$$ (Equation 1)

Therefore, in case of creating a dust distribution image by reflecting dust density, it is necessary to reflect a distance from a subject. To this end, the present disclosure may obtain distance information from a subject based on a stereo vision operation between the first and second cameras 211 and 212. Namely, the present disclosure may primarily obtain a dust distribution image via a light amount ratio of a corresponding specific pixel and correct the primarily obtained dust distribution image based on distance information from a subject corresponding to the specific pixel. For example, although a lot of incident light is scattered due to a long distance from a subject, at least one of a brightness and a chroma may be corrected by reflecting distance information instead of representing a brightness darkly or close to a specific color sense in the dust distribution image. Alternatively, a light amount ratio is calculated by reflecting distance information from the subject corresponding to the specific pixel, whereby a dust distribution image may be obtained.

Hereinafter, an embodiment of outputting a created dust distribution image to a display device is described.

Figure 7:
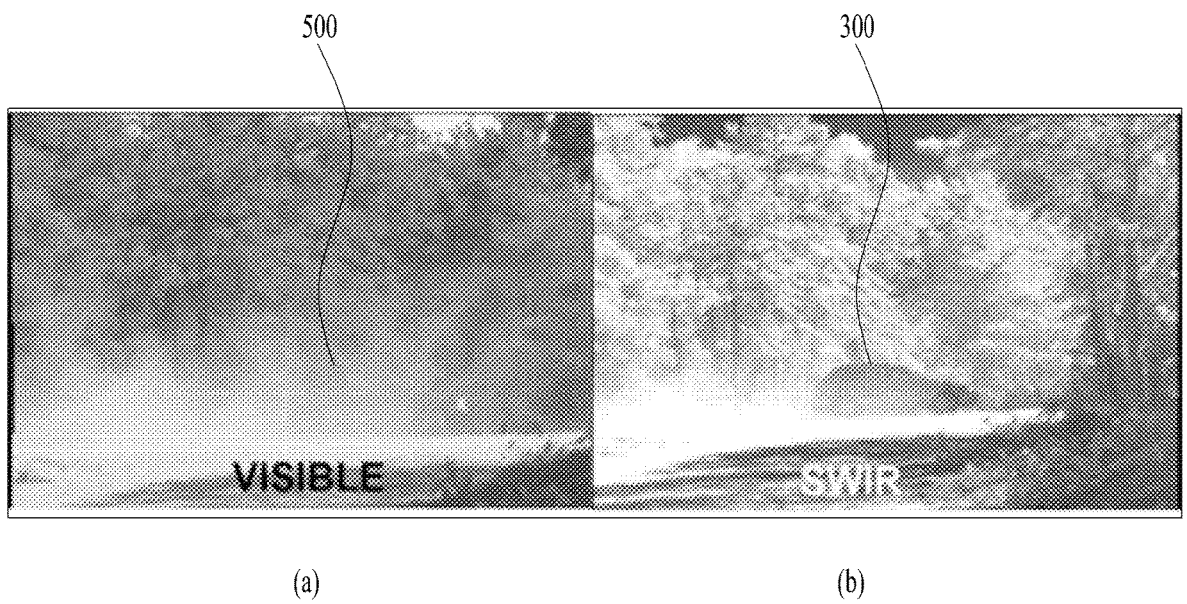
FIG. 7 shows one embodiment of a true color image and an infrared image obtained via a non-coplanar stereo vision camera of the present disclosure.

FIG. 7 shows one embodiment of a true color image and an infrared image obtained via a non-coplanar stereo vision camera of the present disclosure.

The present disclosure may obtain a true color image via the first camera 211 and obtain an infrared image via the second camera 212. At least one of the true color image obtained via the first camera 211 and the infrared image obtained via the second camera 212 may be outputted through the display device. Specifically, FIG. 7 (a) shows the true color image obtained via the first camera 211 and FIG. 7 (b) shows the infrared image obtained via the second camera 212.

A true color image of the present disclosure is obtained by receiving visible light, and visibility may be significantly reduced by dust in the atmosphere. On the other hand, an infrared image cannot provide a color of a subject, but is obtained by receiving infrared light having a wavelength greater than that of visible light, thereby preventing visibility from being lowered due to dust in the atmosphere. Referring to FIG. 7 (a), it may be confirmed that the subject 300 shown in FIG. 7(b) is not well identified due to the dust 500.

In the present disclosure, a fine dust distribution image is superimposed and displayed on a true color image or an infrared image, thereby facilitating a user to visually check the dust distribution. Hereinafter, an embodiment of overlapping and displaying a dust distribution image on at least one of a true color image and an infrared image will be described.

Figure 8:
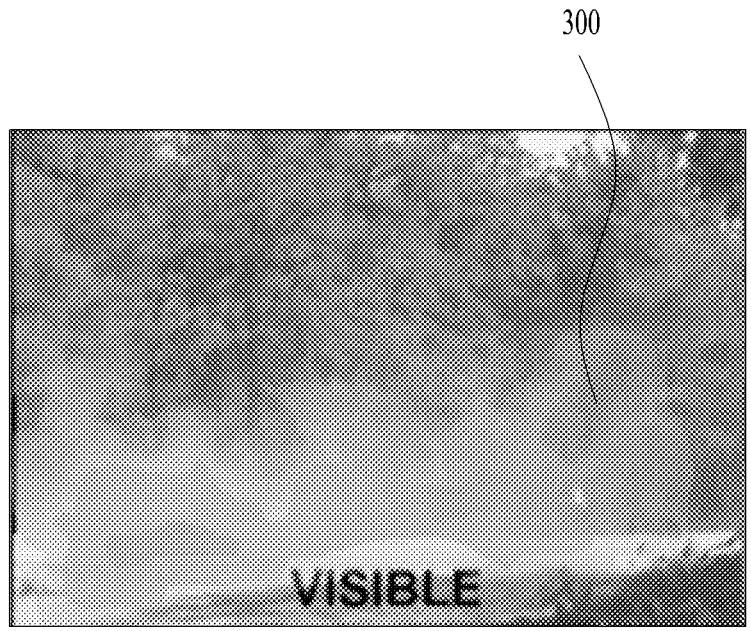
FIG. 8 and FIG. 9 shows dust distribution images obtained via a non-coplanar stereo vision camera according to one embodiment of the present disclosure.
Figure 8:
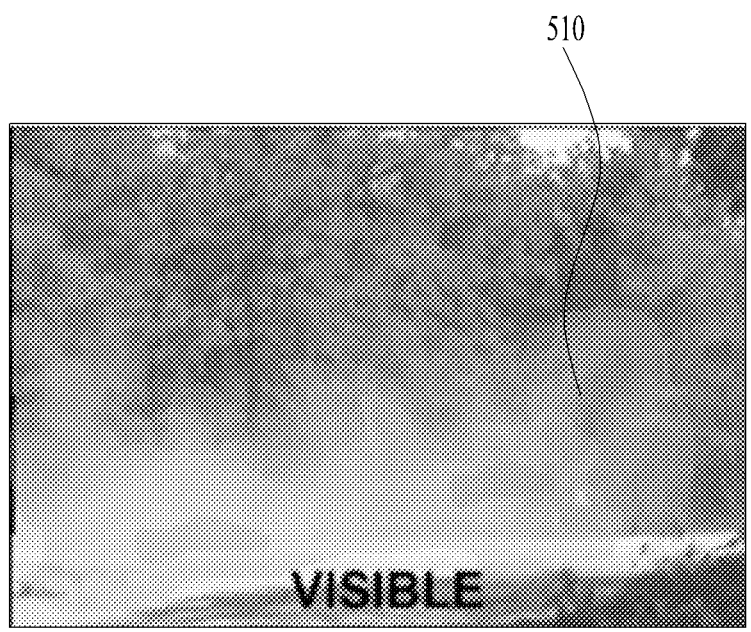
Figure 9:
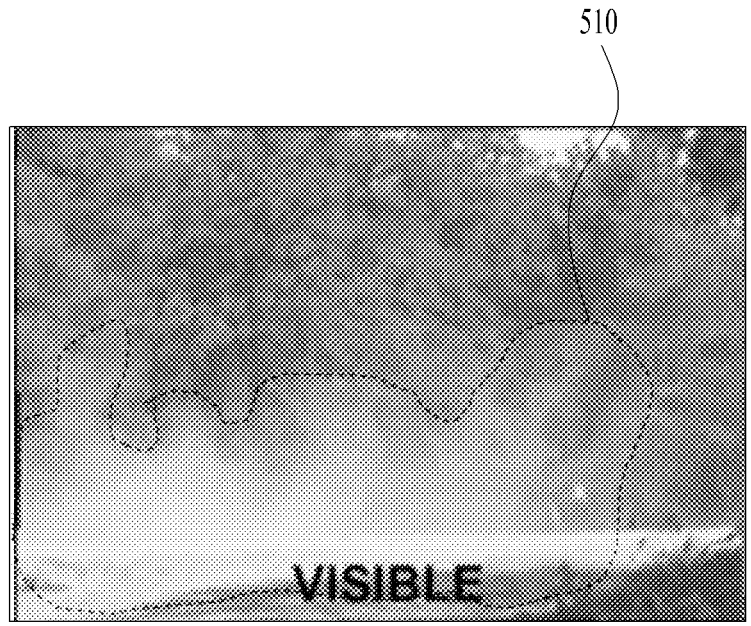
Figure 9:
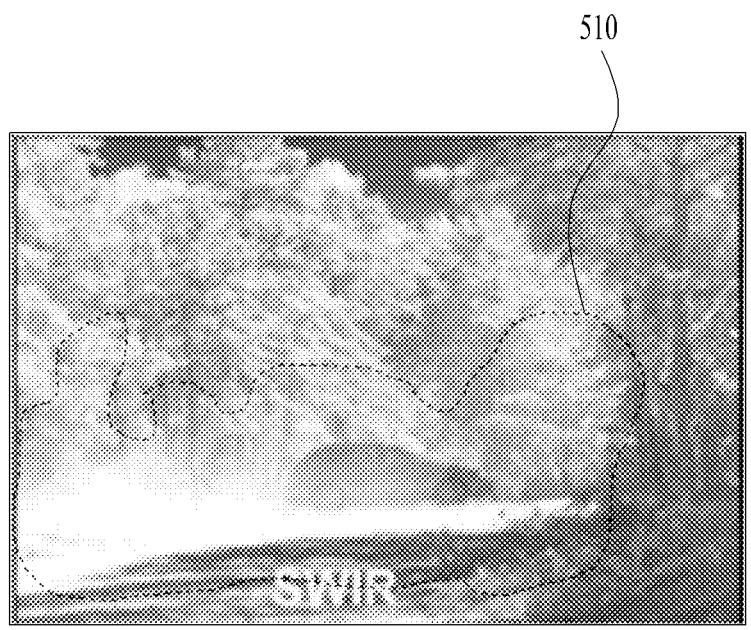

FIG. 8 and FIG. 9 shows dust distribution images obtained via a non-coplanar stereo vision camera according to one embodiment of the present disclosure.

The present disclosure may overlap and display a dust distribution image on at least one of a true color image and an infrared image.

A dust distribution image may include density information, and density may be differently represented using at least one of a brightness and a chroma. Specifically, FIG. 8 (a) shows an embodiment that a dust distribution image is displayed on a true color image and that dust density is visually implemented via a brightness. FIG. 8 (b) shows an embodiment that a dust distribution image is displayed on a true color image and that dust density is visually implemented via a chroma. The brightness and chroma of the dust distribution image may be displayed step by step depending on a specific light amount ratio instead of changing continuously.

A dust distribution image may be displayed by overlapping a true color image or an infrared image through a boundary value as shown in FIG. 9. In detail, FIG. 9 (a) illustrates an embodiment where a dust distributed area is displayed with a boundary on a true color image, and FIG. 9 (b) illustrates an embodiment where a dust distributed area is displayed with a boundary on an infrared image. The boundary may be continuously displayed based on a specific light amount ratio, or may be a boundary of a minimum area including pixels of a light amount ratio greater than or equal to or smaller than a specific light amount ratio. When the dust distribution image is displayed like FIG. 9, it is disadvantageous in that dust density is not known, but the dust distribution image may be simply displayed without disturbing the true color image or the infrared image.

Figure 10:
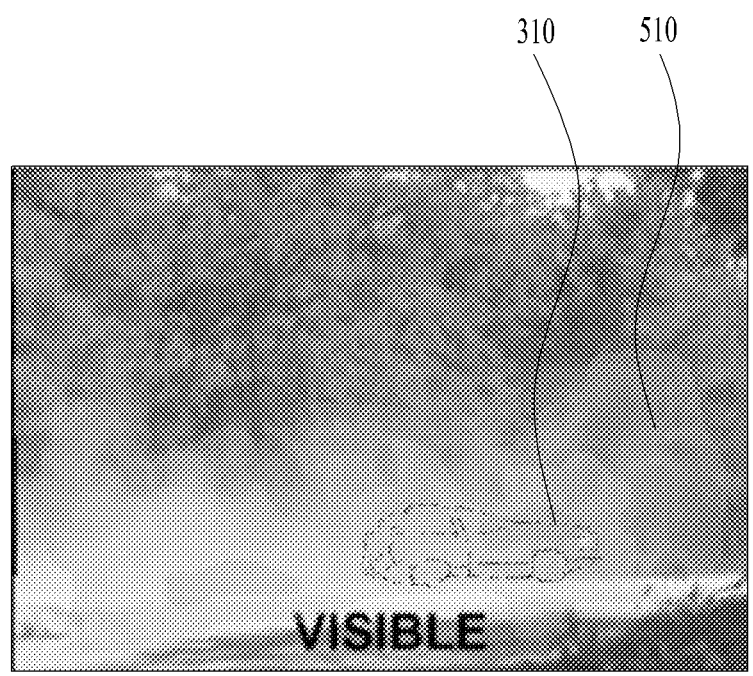
FIG. 10 shows one embodiment of supplementing visibility in a true color image according to one embodiment of the present disclosure.

FIG. 10 shows one embodiment of supplementing visibility in a true color image according to one embodiment of the present disclosure.

When there is a lot of dust in the atmosphere, visibility may not be sufficiently secured as described with reference to FIG. 7. In this case, the present disclosure may secure visibility through an infrared image.

In the present disclosure, when a light amount ratio between the corresponding pixels of the first pixel array 2111 and the second pixel array 2121 belongs to a preset range, it may be determined that it is difficult to secure visibility through a true color image due to a large amount of dust in the atmosphere. In this case, the present disclosure may supplement area information having a light amount ratio belonging to a preset range through an infrared camera.

The present disclosure may control a display device to output a fine dust distribution image overlapping a true color image, extract subject information at a corresponding position from an infrared image when a light amount ratio is out of a preset range, and output the subject information extracted from the infrared image in a manner of overlapping the true color image. Here, the subject information extracted from the infrared image may include at least one of outline information constituting the subject, position information of subject determination information, and subject position information.

Specifically, FIG. 10 illustrates an embodiment in which a fine dust distribution image 510 is displayed on a true color image and outline information of a specific subject 310 is displayed in an area in which a light amount ratio falls within a preset range. Here, the outline information of the specific subject 310 may be obtained through an infrared image. Accordingly, a user may confirm distribution and density of dust and a presence of the specific subject 310 existing behind the dust.

In some cases, the present disclosure may control the display device to output the dust distribution image 510 to overlap the true color image. If a light amount ratio deviates from a preset range, the display device may be controlled to output an infrared image instead of a true color image and output the dust distribution image 510 to overlap the infrared image.

FIGS. 11 to 15 are flowcharts to describe a method of obtaining a dust distribution image according to one embodiment of the present disclosure.

Figure 11:
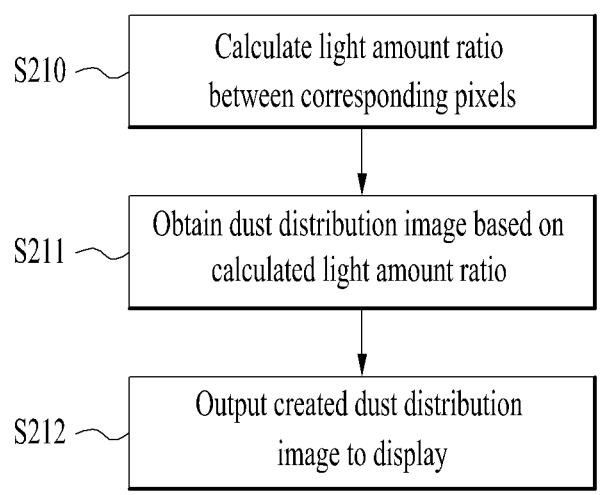
FIGS. 11 to 15 are flowcharts to describe a method of obtaining a dust distribution image according to one embodiment of the present disclosure.

In a dust measuring device including a stereo vision camera including a first camera for obtaining a true color image and a second camera for obtaining an infrared image, as shown in FIG. 11, the present disclosure may include a step S210 of calculating a light amount ratio between corresponding pixels of a first pixel array of the first camera and a second pixel array of the second camera, a step S211 of obtaining a dust distribution image based on the calculated light amount ratio, and a step S212 of outputting the obtained dust distribution image via a display device.

Here, in the step S210 of calculating the light amount ratio between the corresponding pixels of the first pixel array and the second pixel array, when the first camera and the second camera have the same resolution, the light amount ratio may be calculated in a manner of putting pixels in one-to-one correspondence. When the first camera and the second camera differ from each other in resolution, the light amount ratio may be calculated in a manner of dividing an amount of light incident on at least one of one pixel of the first pixel array and one pixel of the second pixel array based on the resolution difference.

Here, the step S211 of obtaining the dust distribution image through the calculated light amount ratio may be a step of obtaining a dust distribution image including dust density information. The dust density information may be displayed by varying at least one of a brightness and a chroma in response to the light amount ratio. For example, in case of a light amount ratio corresponding to high dust density, at least one of a brightness and a chroma may be increased to obtain a dust distribution image. In case of a light amount ratio corresponding to low dust density, a dust distribution image may be obtained by lowering at least one of the brightness and the chroma.

Figure 12:
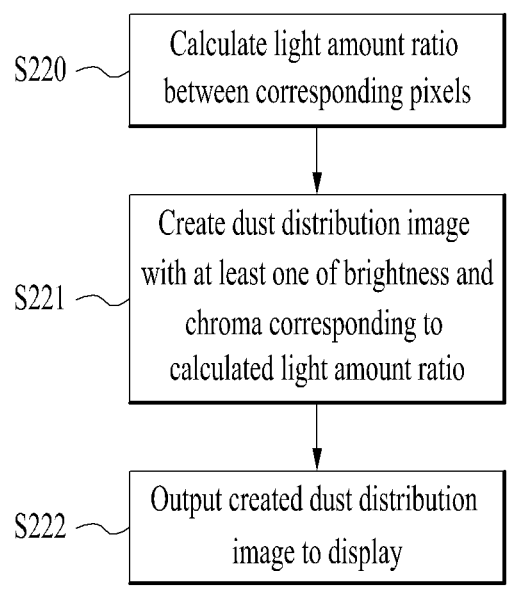

Specifically, as shown in FIG. 12, the present disclosure may include a step S220 of calculating a light amount ratio between corresponding pixels, a step S221 of creating a dust distribution image with at least one of a brightness and a chroma corresponding to the calculated light amount ratio, and a step S222 of outputting the created dust distribution image to a display.

In this case, the light amount ratio may be a light amount ratio in which distance information from a subject is reflected. Specifically, as the distance from the subject increases, the light incident on the camera may be exponentially scattered in the air and attenuated. Accordingly, even if dust density is low, when the distance from the subject is far, the light amount ratio may be calculated to correspond to high dust density. Accordingly, the present disclosure may obtain a dust distribution image by calculating distance information of a subject via a stereo camera and reflecting the distance information in the light amount ratio.

Figure 13:
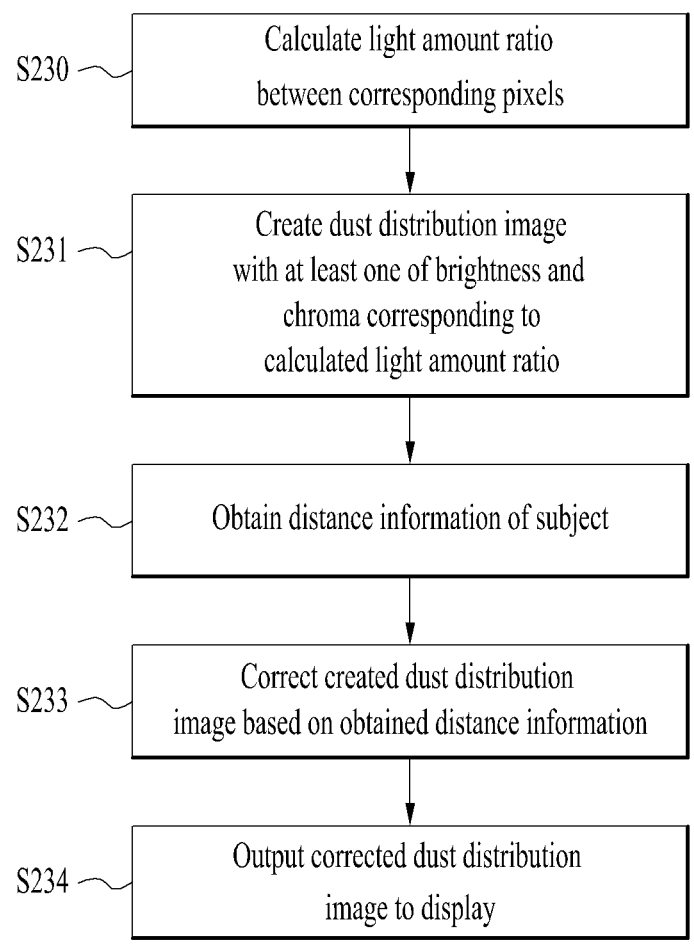

Specifically, as shown in FIG. 13, the present disclosure may include a step S230 of calculating a light amount ratio between corresponding pixels, a step S231 of creating a dust distribution image with at least one of a brightness and a chroma corresponding to the calculated light amount ratio, a step S232 of obtaining distance information of a subject via a stereo operation between two images obtained by a stereo vision camera, a step S233 of correcting the dust distribution image created based on the obtained distance information, and a step S234 of outputting the corrected dust distribution image to a display. In this case, the step S232 of obtaining the distance information of the subject may be performed before the step S230 of calculating the light amount ratio to calculate the light amount ratio reflecting the distance information, and, of course, a dust distribution image may be then obtained correspondingly.

The step S212 of outputting the obtained dust distribution image via the display device in FIG. 11 may display the dust distribution image in a manner of overlapping a true color image obtained via the first camera or an infrared image obtained via the second camera. In this case, if dust density (or light amount ratio) of the created dust distribution image belongs to a preset range, the present disclosure may control an output method differently.

Figure 14:
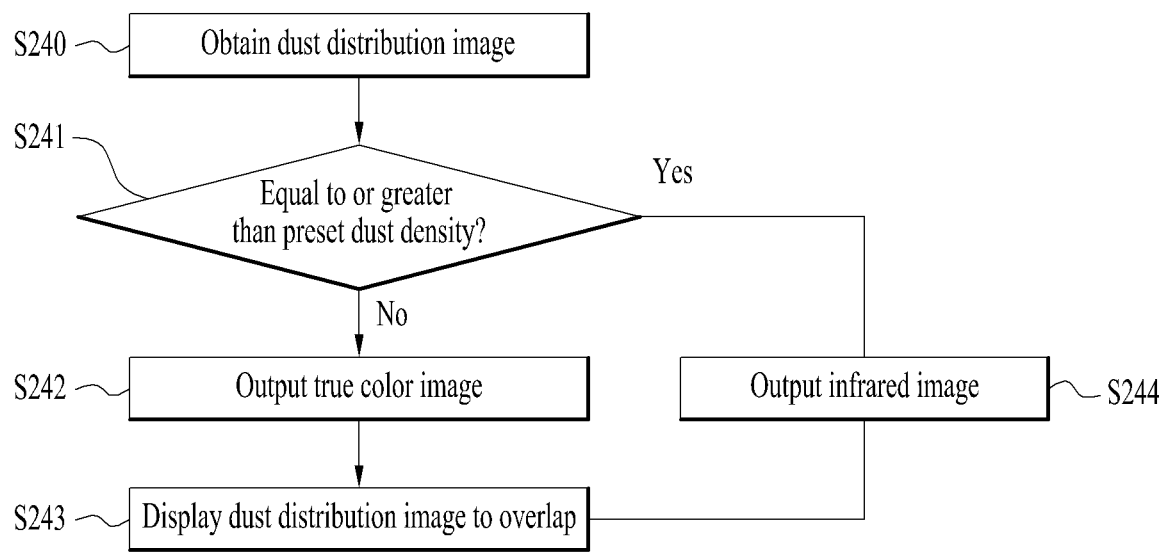

Specifically, as shown in FIG. 14, the present disclosure may include a step S240 of obtaining a dust distribution image, a step S241 of determining whether dust distribution density is equal to or greater than a preset range, a step S234 of if the dust distribution density is smaller than the preset range [S241, No], outputting a true color image, and a step S243 of displaying a dust distribution image in a manner of overlapping the true color image. If the dust distribution density is equal to or greater than a preset range [S241, Yes], the present disclosure may include a step S244 of outputting an infrared image and a step S243 of displaying the dust distribution image in a manner of overlapping the infrared image.

Figure 15:
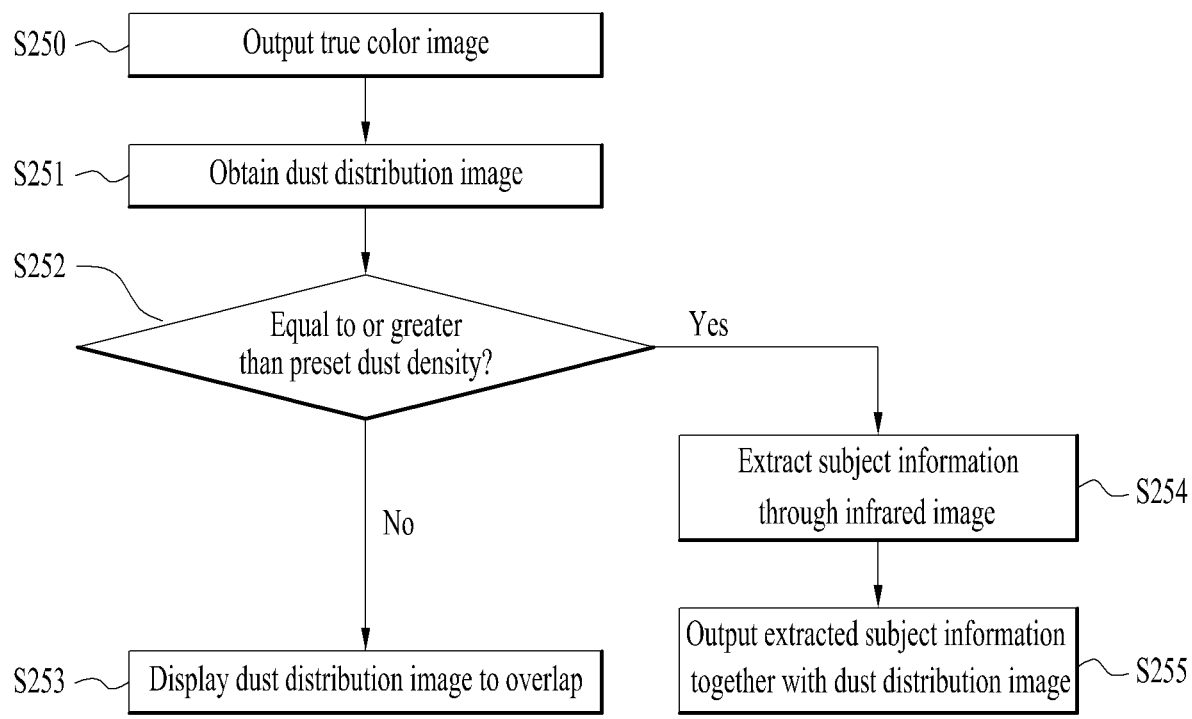

Alternatively, as shown in FIG. 15, the present disclosure may include a step S251 of obtaining a dust distribution image in the course of outputting a true color image [S250], a step S252 of determining whether dust distribution density is equal to or greater than a preset range, and a step S253 of displaying the dust distribution image in a manner of overlapping the true color image if the dust distribution density is smaller than the preset range [S251, No]. The present disclosure may include a step s254 of extracting subject information via an infrared image at a corresponding position if the dust distribution density is equal to or greater than the preset range [S251, Yes] and a step S255 of outputting the extracted subject information to the true color image together with the dust distribution image. In some cases, the extracted subject information may be displayed only in a manner of overlapping the true color image without outputting the dust distribution image.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. An apparatus for measuring dust, comprising:
a stereo vision camera including a first camera obtaining a true color image and a second camera obtaining an infrared image;
a controller configured to create a fine dust distribution image based on a light amount ratio of a light amount obtained from a first pixel array of the first camera to a light amount obtained from a second pixel array of the second camera; and
a display device configured to output the fine dust distribution image,
wherein the controller obtains distance information of a subject via a stereo vision operation between the true color image and the infrared image and creates the fine dust distribution image to differentiate at least one of a brightness or a chroma in response to the distance information.

2. The apparatus of claim 1, wherein the controller creates the fine dust distribution image to differentiate at least one of the brightness or the chroma in response to the light amount ratio.

3. The apparatus of claim 1, wherein the second camera obtains the infrared image by detecting at least one of reflective infrared or thermal infrared.

4. The apparatus of claim 3, wherein the reflective infrared includes at least one of Near Infrared (NIR) or Short-Wave Infrared (SWIR) applied from a light source.

5. The apparatus of claim 3, wherein the thermal infrared includes at least one of Medium Wave Infrared (MWIR) or Far Infrared (FIR) as infrared irradiated from the subject.

6. The apparatus of claim 1, further comprising a memory storing the light amount ratio related to fine dust density.

7. The apparatus of claim 1, wherein the display device outputs the fine dust distribution image to overlap at least one of the true color image or the infrared image.

8. The apparatus of claim 1, wherein the controller controls the display device to output the fine dust distribution image to overlap the true color image, and
wherein if the light amount ratio belongs to a preset range, the controller controls the display device to output the fine dust distribution image to overlap the infrared image.

9. The apparatus of claim 1, wherein the controller controls the display device to output the fine dust distribution image to overlap the true color image, and
wherein if the light amount ratio belongs to a preset range, the controller extracts subject information at a corresponding position from the infrared image and controls the display device to output the subject information to overlap the true color image.

10. The apparatus of claim 9, wherein the subject information comprises at least one of outline information configuring the subject, determination information of the subject, or position information of the subject.

11. The apparatus of claim 1, wherein the first camera has a same resolution of the second camera and obtains the light amount ratio between counter-pixels of the first and second pixel arrays.

12. The apparatus of claim 1, wherein the first camera has a resolution different from that of the second camera, and
wherein the controller obtains the light amount ratio by dividing an amount of light incident on at least one of one pixel of the first pixel array or one pixel of the second pixel array based on a difference in the resolution.

13. An apparatus for measuring dust, comprising:
a stereo vision camera including a first camera obtaining a true color image and a second camera obtaining an infrared image;
a controller configured to create a fine dust distribution image based on a light amount ratio of a light amount obtained from a first pixel array of the first camera to a light amount obtained from a second pixel array of the second camera; and
a display device configured to output the fine dust distribution image,
wherein the controller controls the display device to output the fine dust distribution image to overlap the true color image, and
wherein if the light amount ratio belongs to a preset range, the controller controls the display device to output the fine dust distribution image to overlap the infrared image.

14. An apparatus for measuring dust, comprising:
a stereo vision camera including a first camera obtaining a true color image and a second camera obtaining an infrared image;
a controller configured to create a fine dust distribution image based on a light amount ratio of a light amount obtained from a first pixel array of the first camera to a light amount obtained from a second pixel array of the second camera; and
a display device configured to output the fine dust distribution image,
wherein the first camera has a resolution different from that of the second camera, and
wherein the controller obtains the light amount ratio by dividing an amount of light incident on at least one of one pixel of the first pixel array or one pixel of the second pixel array based on a difference in the resolution.

* * * * *